(12) United States Patent
Ooura

(10) Patent No.: US 10,260,853 B2
(45) Date of Patent: Apr. 16, 2019

(54) LINEAR GAGE

(71) Applicant: MITUTOYO CORPORATION, Kawasaki-shi, Kanagawa (JP)

(72) Inventor: Yuji Ooura, Tokyo (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 159 days.

(21) Appl. No.: 15/483,090

(22) Filed: Apr. 10, 2017

(65) Prior Publication Data

US 2017/0314903 A1    Nov. 2, 2017

(30) Foreign Application Priority Data

Apr. 27, 2016 (JP) ................. 2016-089892

(51) Int. Cl.
| | | |
|---|---|---|
| *G01D 5/347* | (2006.01) | |
| *G01B 3/22* | (2006.01) | |
| *G01D 5/26* | (2006.01) | |
| *G01B 5/004* | (2006.01) | |
| *G01B 5/008* | (2006.01) | |
| *G01B 5/012* | (2006.01) | |

(52) U.S. Cl.
CPC ............. *G01B 3/22* (2013.01); *G01B 5/004* (2013.01); *G01B 5/008* (2013.01); *G01B 5/012* (2013.01); *G01D 5/26* (2013.01); *G01D 5/34746* (2013.01)

(58) Field of Classification Search
CPC ................................. G01D 5/34746
USPC ................................. 33/706–708
See application file for complete search history.

(56) References Cited

U.S. PATENT DOCUMENTS

| | | | | |
|---|---|---|---|---|
| 4,476,634 A * | 10/1984 | Yamamoto | ............... | G01B 3/26 33/501.4 |
| 4,512,082 A * | 4/1985 | Burkhardt | .......... | G01D 5/24452 33/706 |
| 4,561,185 A * | 12/1985 | Sakata | ................. | G01B 5/0011 33/817 |
| 4,798,004 A * | 1/1989 | Suzuki | .................. | G01B 3/205 33/793 |
| 4,972,599 A * | 11/1990 | Ernst | ........................ | G12B 5/00 33/1 N |
| 6,002,126 A * | 12/1999 | Feichtinger | ........ | G01D 5/34707 250/231.13 |
| 2005/0274034 A1* | 12/2005 | Hayashida | ............... | G01B 3/18 33/813 |
| 2006/0064890 A1* | 3/2006 | Brandl | ............... | G01D 5/24442 33/706 |

(Continued)

FOREIGN PATENT DOCUMENTS

| | | |
|---|---|---|
| JP | H08-27161 A | 1/1996 |
| JP | 2557171 B2 | 11/1996 |
| JP | 2007-322248 A | 12/2007 |

(Continued)

*Primary Examiner* — Christopher W Fulton
(74) *Attorney, Agent, or Firm* — Oliff PLC

(57) ABSTRACT

A linear gage includes a spindle, a guide cylinder surrounding a portion of the spindle and configured to guide the spindle to move forward and rearward in an axis line direction, and a guide slit portion having a guide slit extending parallel to the axis line of the guide cylinder, with a gap provided between the guide slit and an outer surface of the guide cylinder. An attitude adjustment pin extends into the guide slit and is fixed to a side surface of the spindle. The attitude adjustment pin is an eccentric pin.

16 Claims, 14 Drawing Sheets

(56) References Cited

U.S. PATENT DOCUMENTS

2018/0038677 A1\* 2/2018 Meyer .................. G01B 5/0004

FOREIGN PATENT DOCUMENTS

| JP | 2015-75397 A | 4/2015 |
| JP | 2016-14534 A | 1/2016 |

\* cited by examiner

LINEAR GAGE

CROSS-REFERENCE TO RELATED APPLICATION

This application claims priority from Japanese Patent Application No. 2016-089892 filed in the Japan Patent Office on Apr. 27, 2016. The entire contents of the prior application are hereby incorporated by reference.

BACKGROUND

The disclosure relates to linear gages. More particularly, the disclosure relates to alignment adjustment in linear gages.

A linear gage is known as a small-size precision measuring instrument (See Japanese Patent Publication No. H8-27161B, Japanese Patent No. 2557171B, Japanese Unexamined Patent Application Publication No. 2007-322248A, Japanese Unexamined Patent Application Publication No. 2015-75397A and Japanese Unexamined Patent Application Publication No. 2016-14534A, for example). (Note that names such as digital dial gage, electronic micrometer, Digimatic indicator ("Digimatic" is a trademark), linear gage, and the like are also used.)

A linear gage measures a workpiece with an extremely high level of precision by using a digital encoder to precisely detect displacement in the axial direction of a spindle.

FIG. 1 schematically illustrates the inner mechanism of a linear gage.

In FIG. 1, a spindle 110 is a cylindrical rod that is guided to move forward and rearward by a bushing 10. A pin 112 is inserted into a side surface of the spindle 110 to prevent the spindle 110 from rotating, and a guide slit 11 is formed in the bushing 10. The guide slit 11 is formed such that the pin 112 can be passed therethrough, and the guide slit 11 is longer in the axial direction. The guide slit 11 guides the pin 112 such that the spindle 110 can move forward and rearward in the axial direction but is restricted from rotating around the longitudinal axis of the gage, which extends in the axial direction.

An encoder 300 is provided at a rear end side of the spindle 110. The encoder 300 is constituted of a scale 310 and a detection head 320. The scale 310 is fixed to the rear end of the spindle 110, and the detection head 320 is disposed opposite the scale 310 with a predetermined gap provided therebetween.

The measuring accuracy of a linear gage depends on the processing accuracy (the manufacturing accuracy) of the components and the detection accuracy of the encoder 300.

In terms of the processing accuracy of the components, it is extremely important that the spindle moves straight, for example. Thus, effort is made to increase the straightness of the spindle 110 itself, as well as the processing accuracy of the inner surface of the bushing 10, to the greatest extent possible. Meanwhile, to increase the detection accuracy of the encoder 300, it is necessary for the scale 310 and the detection head 320 to be kept parallel across the entire measurement stroke. If the spindle 110 rotates around the axis even slightly, the relative attitudes of the scale 310 and the detection head 320 will shift, which destabilizes the detection accuracy by that amount. As such, effort is made to finish the outer diameter of the pin 112 and the width of the guide slit 11 with a high level of precision, such that there is no looseness (gap, play) between the pin 112 and the guide slit 11.

SUMMARY

Making the scale surface of the scale 310 and the detection surface of the detection head 320 parallel with a high level of precision is extremely important for ensuring a high level of detection accuracy in the encoder 300.

However, there are of course limitations on the actual processing accuracy of components, and thus a situation where the scale surface of the scale 310 and the detection surface of the detection head 320 are shifted from a parallel state is sometimes unavoidable when the device is assembled to form the final product.

One school of thought is simply to accept that the measuring accuracy which can be ensured in the product is limited by machining error in the components. This means, for example, assuming that a measurement resolution of 0.1 µm can be ensured, in light of the cumulative machining error in the components.

Another school of thought involves employing an encoder in which skew in the attitudes has no effect on the measuring accuracy. For example, Japanese Patent No. 2557171 employs a laser holoscale (LHS) as such a high-precision and stable encoder. Doing so ensures high precision and high resolution, such as a measuring accuracy of 0.01 µm, even if there is cumulative machining error in the components. However, small-sized encoders that are highly robust with respect to attitude skew, which of course includes laser holoscales (LHS), are extremely expensive and thus unavoidably increase the cost of the product. Such products may have ten times the measuring accuracy, but will also have ten times the cost (or more).

Thus, an object of the disclosed embodiments is to provide a linear gage having high measuring accuracy without substantially increasing the cost.

A linear gage according to some embodiments includes: a spindle; a guide cylinder surrounding a portion of the spindle and configured to guide the spindle to move forward and rearward in an axis line direction; a guide slit portion having a guide slit extending parallel to the axis line of the guide cylinder, with a gap provided between the guide slit and an outer surface of the guide cylinder; and an attitude adjustment pin that extends into the guide slit and is fixed to a side surface of the spindle. The attitude adjustment pin is an eccentric pin.

Preferably, in at least some embodiments, the attitude adjustment pin includes: a double-ended screw, having threaded portions on both a tip end side and a base end side, with the threaded portion on the base end side screwed into the side surface of the spindle; and a pin head into which the threaded portion on the tip end side of the double-ended screw is screwed, and wherein at least one of the double-ended screw and the pin head is eccentric.

Preferably, in at least some embodiments, a rubber bushing is interposed between the double-ended screw and the pin head.

Preferably, in at least some embodiments, a scale or a detection head of a reflective photoelectric encoder is fixed to the spindle.

DETAILED DESCRIPTION OF EMBODIMENTS

A feature of the disclosed embodiments is that a locking pin is provided with an attitude adjustment mechanism. However, before describing the specific configuration of the embodiments, a problem with past techniques will be described to help clarify the significance of the embodiments. These descriptions will refer to FIGS. 2 to 4.

Figure 1:
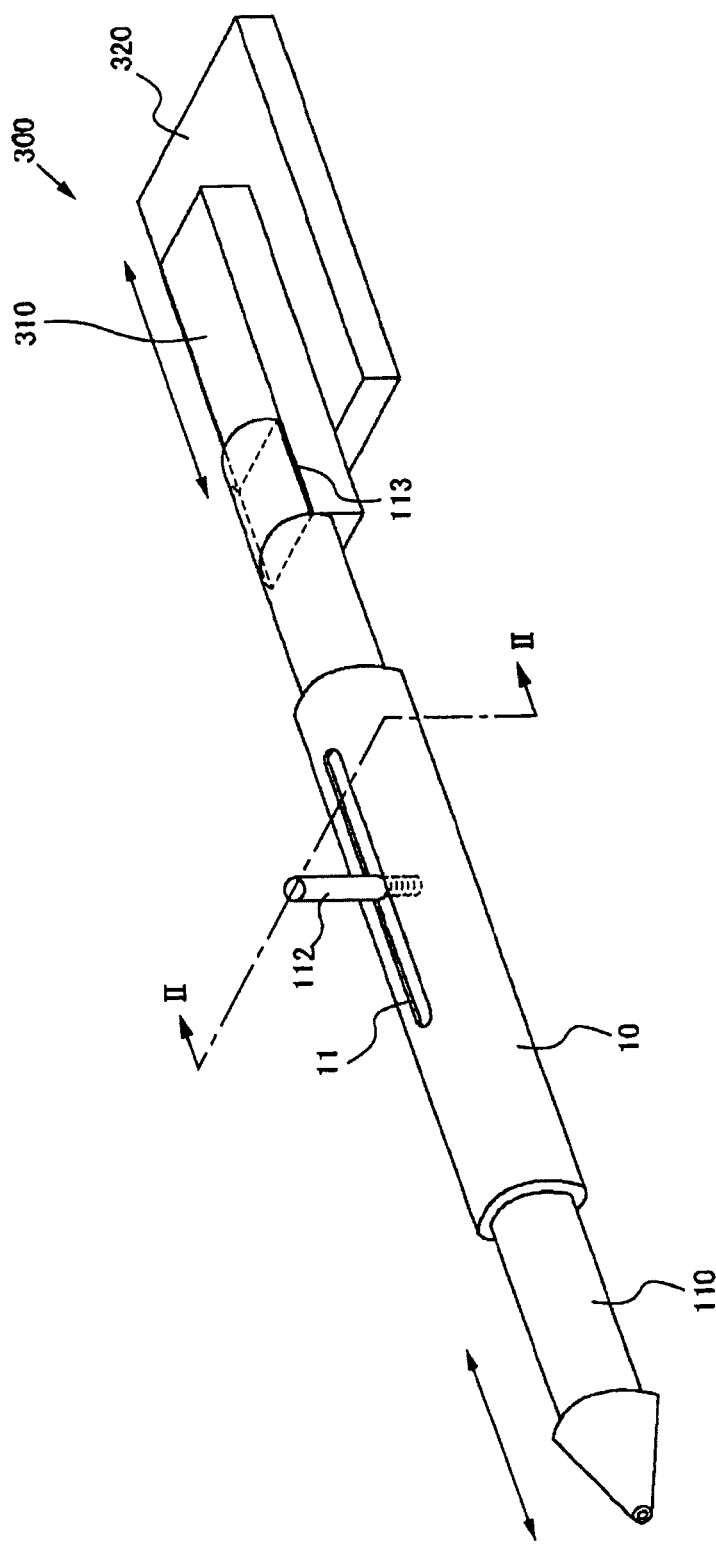
FIG. 1 is a diagram schematically illustrating the inner mechanism of a conventional linear gage serving as an example of background art.
Figure 2:
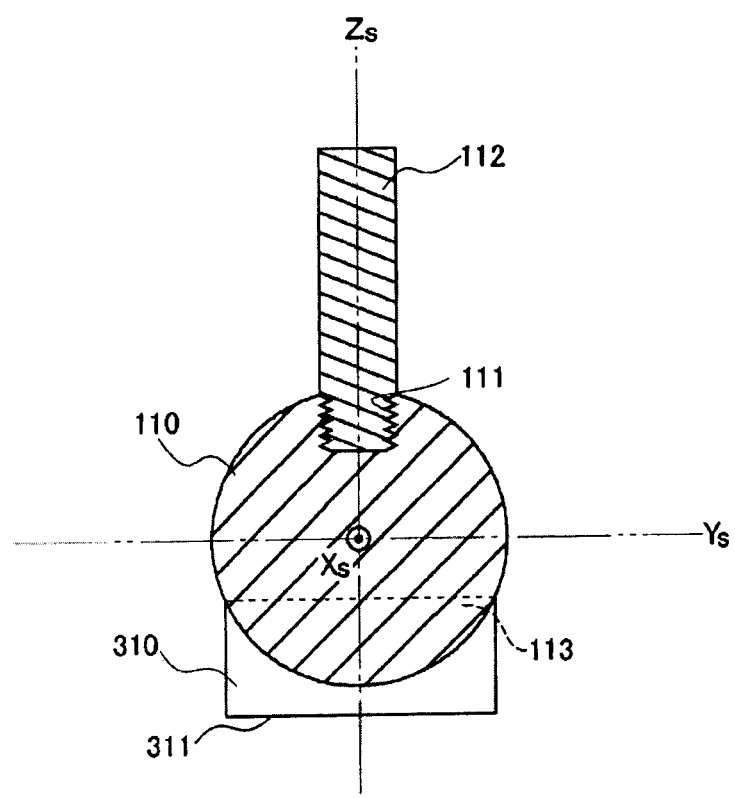
FIG. 2 is a cross-sectional view taken from a line II-II in FIG. 1.

FIG. 2 is a cross-sectional view taken from a line II-II in FIG. 1, and illustrates the spindle 110 and the pin 112 alone.

As illustrated in FIG. 2, a female screw 111 (also called a "threaded portion") is provided in the spindle 110, perpendicular to an axis line ($X_S$) of the spindle 110.

An extension of an axis line of the female screw 111 is represented by $Z_S$.

The spindle 110 has a perfectly circular cross-section, and the female screw 111 is provided perpendicular such that the $Z_S$ axis passes through the center of the spindle 110. Note that the axis line of the spindle 110 corresponds to the $X_S$ axis and an axis perpendicular to both the $Z_S$ axis and the $X_S$ axis is a $Y_S$ axis.

A scale attachment surface 113 is provided in the spindle 110 in order to attach and fix the scale 310 to the spindle 110. The scale attachment surface 113 is machined so as to be perpendicular to the $Z_S$ axis. (Thus, the scale attachment surface 113 is naturally parallel to the $X_S$ axis and the $Y_S$ axis.) As a result, a scale surface 311 of the scale 310 and the axis of the pin 112 (the $Z_S$ axis) are perpendicular. (Note that the axis line of the pin 112 naturally matches the axis line $Z_S$ of the female screw 111.)

Figure 3:
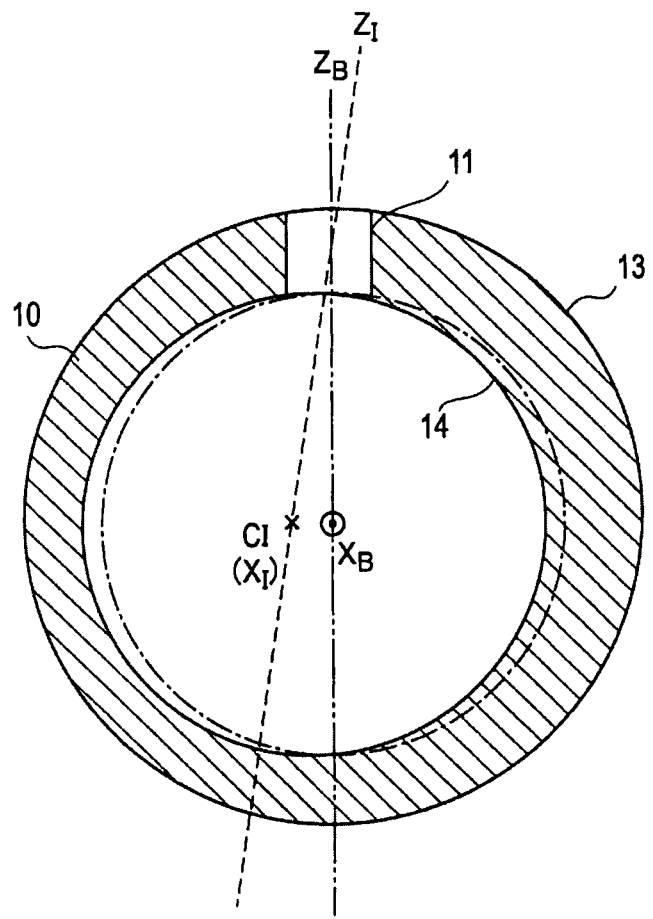
FIG. 3 is a cross-sectional view taken from the line II-II in FIG. 1.

Next, FIG. 3 is a cross-sectional view taken from the line II-II in FIG. 1, and illustrates the bushing 10 alone.

The guide slit 11 is formed in the bushing 10. The guide slit 11 is provided so as to be parallel to an axis line $X_B$ of the bushing 10. Here, an axis passing through the widthwise center of the guide slit 11 and perpendicular to the axis line $X_B$ of the bushing 10 is represented by $Z_B$.

The bushing 10 is cylindrical and thus has an outer circle 13 and an inner circle 14 when viewed as a cross-section. The processing accuracy of the inner circle 14 (the straightness and surface roughness, for example) determines the precision of the spindle movement, and thus the inner circle 14 is finished with an extremely high level of precision.

The outer circle 13 and inner circle 14 of the bushing 10 are designed to be concentric circles. However, it is extremely difficult to machine the bushing 10 such that the outer circle 13 and the inner circle 14 are perfectly concentric.

In particular, small variations in the thickness will unavoidably arise even when attempting to finish the inner circle 14 with an extremely high level of precision. Furthermore, tempering the bushing 10 to increase the durability thereof makes it difficult to avoid deviation from the ideal design values.

The axis line $X_B$ of the bushing 10, mentioned earlier, should also be thought of as a center axis line $X_B$ with respect to the outer circle 13 of the bushing 10.

In FIG. 3, it is assumed that a center CI of the inner circle 14 has shifted slightly to the left from the center of the outer circle 13 ($X_B$). Of course, this shift is exaggerated in FIG. 3 for the sake of explanation. Here, the center axis line of the inner circle 14 is represented by $X_I$. An axis passing through the widthwise center of the guide slit 11 and perpendicular to the center axis line $X_I$ of the inner circle 14 is represented by $Z_I$. Such being the case, there is of course a small amount of skew between the axis line $Z_B$ and the axis line $Z_I$.

Figure 4:
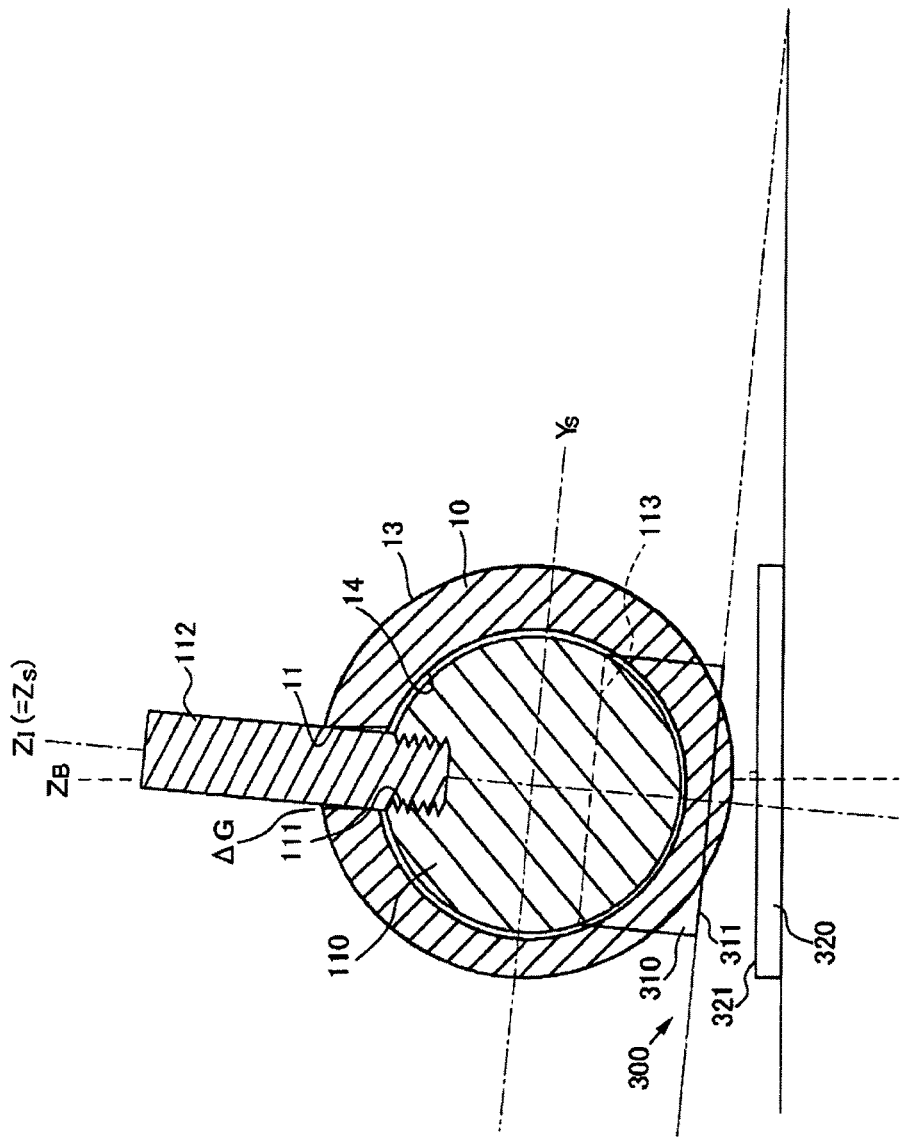
FIG. 4 is a cross-sectional view taken from the line II-II in FIG. 1.

FIG. 4 is a cross-sectional view taken from the line II-II in FIG. 1. The spindle 110 is inserted into the bushing 10. The pin 112 is then passed through the guide slit 11 and attached to the spindle 110 so as to prevent the spindle 110 from rotating.

As described above, in the case where the outer circle 13 and inner circle 14 of the bushing 10 have shifted from being concentric, there will be a small amount of skew between the axis line $Z_B$ and the axis line $Z_I$. (Note that the illustration of FIG. 4 is exaggerated, and the actual amount of skew is on the order of $1/100°$.)

Once the pin 112 is passed through the guide slit 11 and attached to the spindle 110, the axis of the pin 112 ($Z_S$) will match the axis line $Z_I$, but will be tilted slightly with respect to the axis line $Z_B$. Thus, the scale attachment surface 113, and by extension the scale surface 311 of the scale 310 too, will be tilted slightly with respect to the axis line $Z_B$ instead of being perpendicular thereto.

The outer shape of the bushing 10 (the outer circle 13) serves as a reference when determining an attachment position, attachment attitude, and the like between the bushing 10 and the detection head 320. As exemplified in FIG. 4, even if a detection surface 321 of the detection head 320 is perpendicular to the axis line $Z_B$, which is based on the outer shape of the bushing 10 (the outer circle 13), the detection surface 321 will still be tilted relative to the axis $Z_S$ of the pin 112 (that is, the axis $Z_I$). Skew will therefore arise between the scale surface 311 of the scale 310 and the detection surface 321 of the detection head 320 as well, which directly affects the detection accuracy of the encoder 300.

This does not pose a problem when using an expensive laser holoscale. However, if a relatively low-cost encoder is employed, aligning the attitudes of the scale surface 311 and the detection surface 321 of the detection head 320 is extremely important. A reflective photoelectric encoder can be given as an example of an encoder that is relatively low-cost and has the advantage of a small size. Even compared to a transmissive type, the detection accuracy of a reflective photoelectric encoder is greatly affected by skew in the attitudes of the scale 310 and the detection head 320.

The foregoing is of course merely one example. It is also possible that the axis of the female screw 111 will tilt slightly or the detection head 320 will be attached in a slightly tilted state. In either case, when the spindle 110 is a cylindrical rod, error resulting from the scale 310 (or the detection head 320) rotating even slightly around the axis remains a difficult problem to solve.

An embodiment will now be described with reference to the drawings and the reference numerals appended to the elements illustrated in the drawings.

First Embodiment

Figure 5:
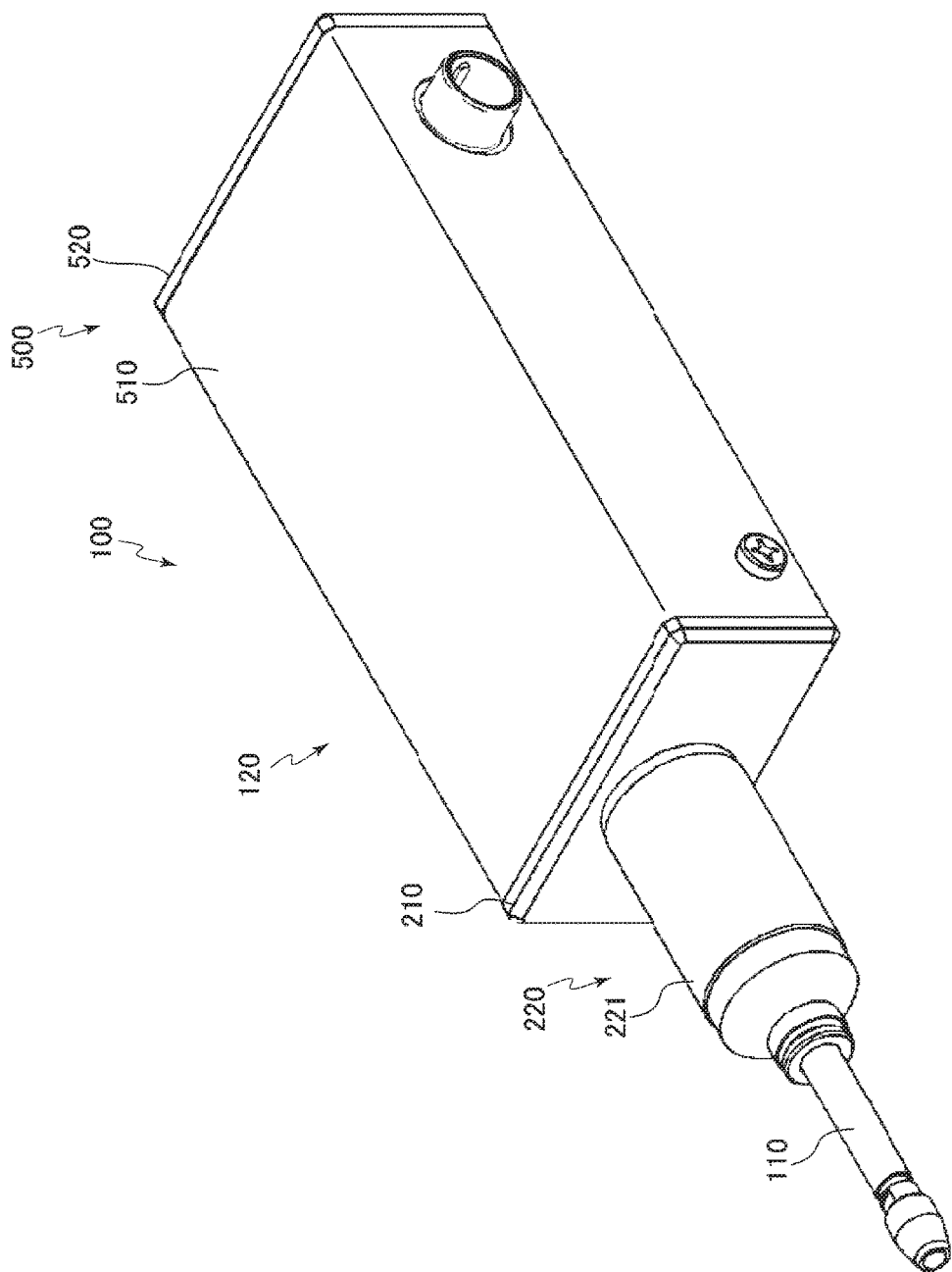
FIG. 5 is an external perspective view of a linear gage of an embodiment.

A first embodiment will now be described. FIG. 5 is an external perspective view of a linear gage 100. The linear gage 100 includes a spindle 110 and a holding cylinder 120 that holds the spindle 110 in a mobile state. The spindle 110 itself is the same as the typical spindle 110 introduced in FIGS. 1 to 4. For example, as illustrated in FIGS. 6 and 7, a female screw 111 for holding a pin (which in the embodiment is an attitude adjustment pin 400) and a scale attachment surface 113 for attaching and fixing a scale 310 of an encoder 300 are formed in the spindle 110.

The main body 120 holds the spindle 110 to move forward and rearward in an axial direction, and detects displacement of the spindle 110. FIG. 6 is a cross-sectional view of the linear gage 100. The main body 120 includes a holding cylinder 200, the encoder 300, the attitude adjustment pin 400, and a cover part 500.

Figure 7:
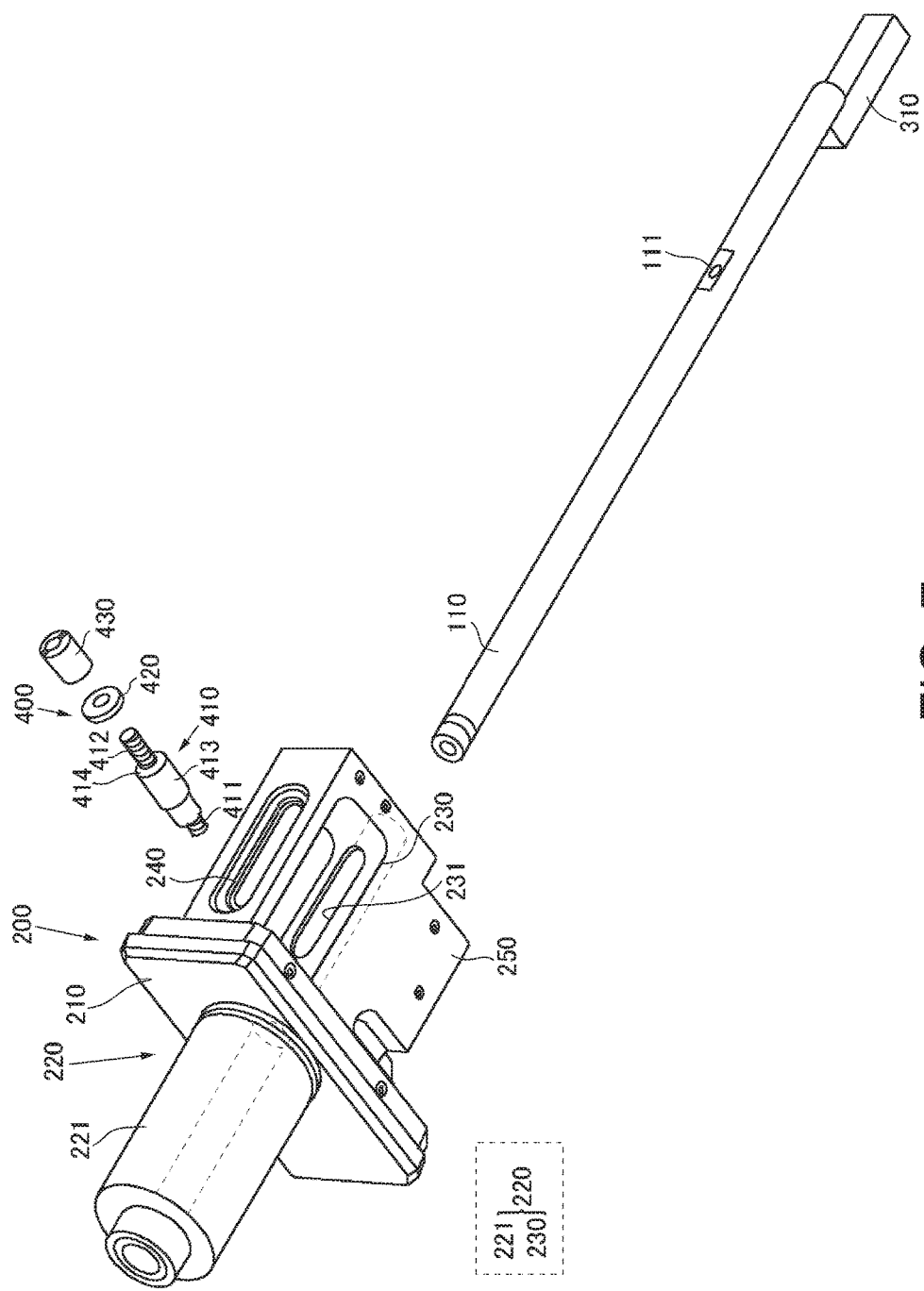
FIG. 7 is an external perspective view of a holding cylinder of an embodiment.
Figure 8:
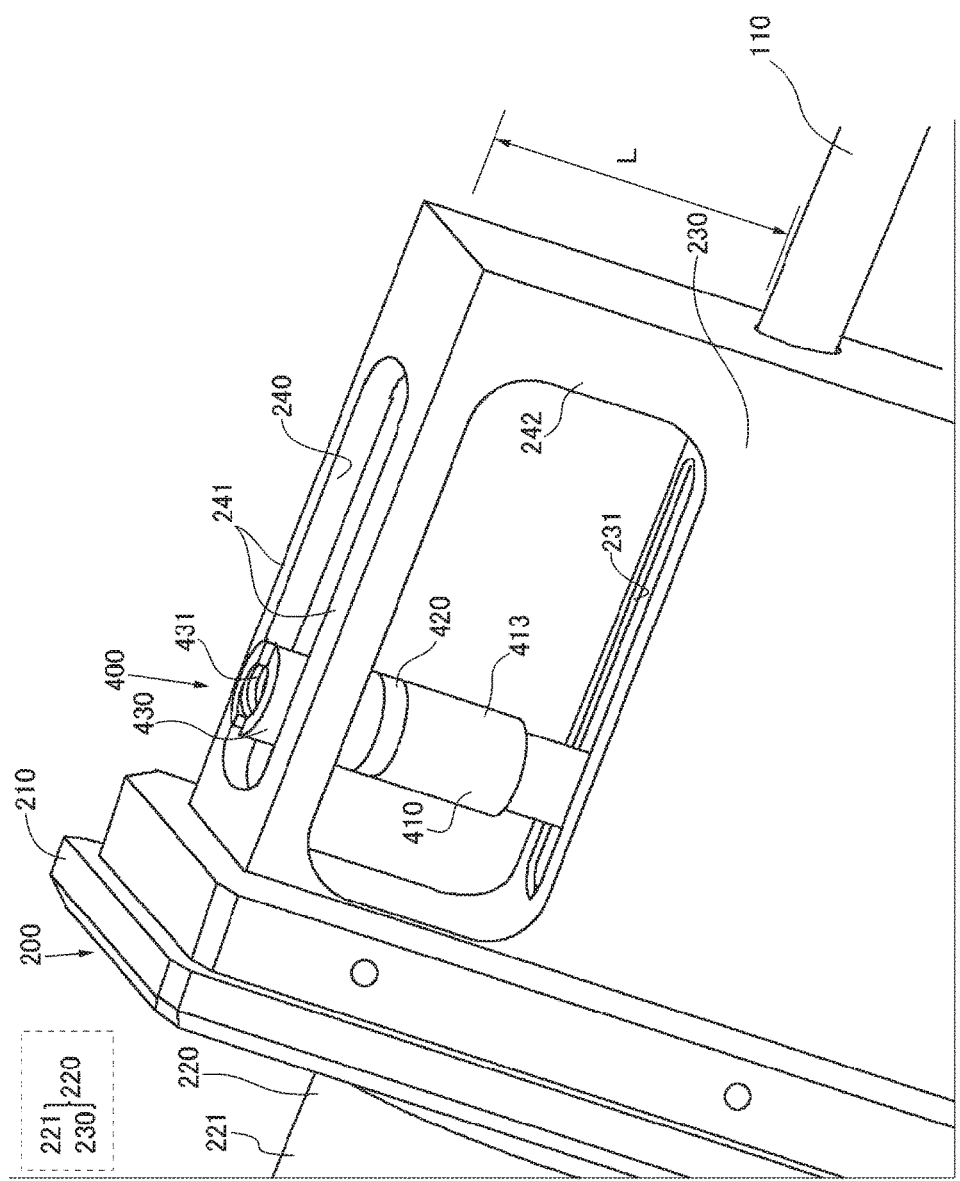
FIG. 8 is a partial enlarged view of the holding cylinder of an embodiment.

FIG. 7 is an external perspective view of the holding cylinder 200, and FIG. 8 is a partial enlarged view of the holding cylinder 200. The holding cylinder 200 is a cylinder member that holds the spindle 110 to move forward and rearward in the axial direction, but is formed such that other functions are also integrated therein. That is, the holding cylinder 200 is formed with an end plate 210, a guide cylinder part 220, a guide slit portion 240, and a mount 250 in an integrated state.

Figure 6:
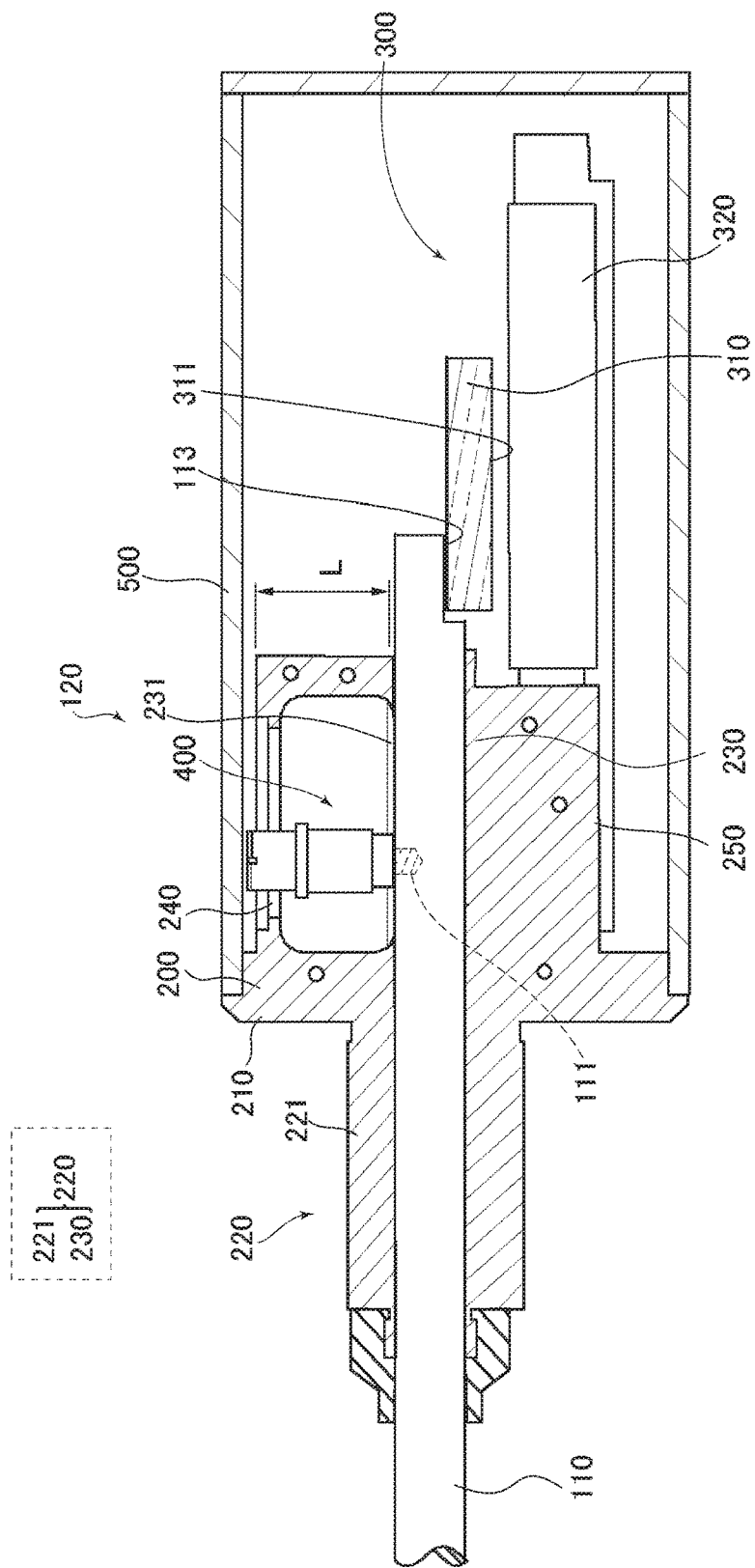
FIG. 6 is a cross-sectional view of the linear gage of an embodiment.

To facilitate understanding of the descriptions, the left side of the drawing in FIG. 6 is referred to as the "front" of the linear gage 100 and the right side is referred to as the "rear" of the linear gage 100. (In other words, a tip side of the spindle 110 corresponds to the front side of the linear gage 100, and a base side of the spindle 110 corresponds to the rear side of the linear gage 100.)

References to "top" and "bottom" will also be based on the directions in the drawing in FIG. 6.

The holding cylinder 200 includes the end plate 210, which is rectangular and closes off a front end of the cover part 500. The guide cylinder part 220, the guide slit portion 240, and the mount 250 are attached to the end plate 210 in an integrated state. As illustrated in FIG. 6, for example, the guide cylinder part 220 is a cylinder into which the spindle 110 is inserted in a front-rear direction, and an inner surface of the guide cylinder part 220 is finished with a high level of precision so as to bear and precisely guide the spindle 110. Although the drawings depict the spindle 110 as being borne directly by the inner surface of the guide cylinder part 220, a separate bearing may be interposed between the guide cylinder part 220 and the spindle 110. For example, one or more roller bearings may be employed as the bearing.

The guide cylinder part 220 is provided so as to extend both to the front (221) and to the rear (230) of the end plate 210. Here, the part of the guide cylinder part 220 extending like a nozzle on the front side of the end plate 210 is referred to as a front guide cylinder 221. On the other hand, a rear guide cylinder 230 is provided on the rear side of the end plate 210 so as to have a cylinder hole communicating with a cylinder hole of the front guide cylinder 221. The guide cylinder part 220 is constituted of the front guide cylinder 221 extending to the front of the end plate 210 and the rear guide cylinder 230 extending to the rear of the end plate 210, with the end plate 210 located therebetween.

The rear guide cylinder 230 extends on the rear side of the end plate 210, and the guide slit portion 240 is also formed on the rear side of the end plate 210, on the upper side of the rear guide cylinder 230, whereas the mount 250 is formed on the lower side of the rear guide cylinder 230. Because the holding cylinder 200 is formed in an integrated manner, the rear guide cylinder 230 and the mount 250 are completely connected. Thus, no border between the rear guide cylinder 230 and the mount 250 can be clearly defined. However, even going so far as to interpret the rear guide cylinder 230 and the mount 250 as being the same entity, it does not pose any serious issues with respect to the following descriptions.

The guide slit portion 240 is a slit formed parallel to the axis line of the guide cylinder part 220 (the rear guide cylinder 230) with a gap L provided between the guide slit portion 240 and the rear guide cylinder 230 in the vertical direction. The length of the guide slit portion 240 should be equal to or longer than the measurement stroke of the spindle 110. The attitude adjustment pin 400 is passed through the guide slit portion 240 and fixed to a side surface of the spindle 110 such that the guide slit portion 240 restricts rotation of the attitude adjustment pin 400, which in turn prevents the spindle 110 from rotating.

A variety of methods for forming a slit to serve as the guide slit portion 240 above the rear guide cylinder 230 are conceivable. In the embodiment, two guide rails 241 are provided parallel to each other at the width (sides) of the guide slit portion 240, above the rear guide cylinder 230 at a distance equivalent to the gap L. A wall 242 standing upright in the vertical direction is connected to rear ends of the two guide rails 241, and front ends of the two guide rails 241 are connected to a rear surface of the end plate 210.

A slit 231 that is parallel to the guide slit portion 240 is formed in the rear guide cylinder 230 and has a slightly greater width than the width of the guide slit portion 240. The slit 231 is simply for the attitude adjustment pin 400 to be loosely inserted, and is nothing more than a gap for passing the attitude adjustment pin 400 to the spindle 110 from the guide slit portion 240. As such, the slit 231 will be referred to as a loose insertion slit 231. Although the loose insertion slit 231 is described here as being formed wider than the guide slit portion 240, part of the bottom portion of the attitude adjustment pin 400 may instead be reduced in diameter to provide the loose fit between the slit 231 and the attitude adjustment pin 400. In either case, the loose insertion slit 231 should not completely restrict the attitude adjustment pin 400.

The width of the guide slit portion 240 and the diameter of (the top part of) the attitude adjustment pin 400 are finely finished so that there is no looseness between the two. Additionally, machining is carried out such that a line connecting the widthwise center of the guide slit portion 240 to the center of the cylinder hole of the guide cylinder part 220 (the rear guide cylinder 230) matches a centerline of the outer shape of the holding cylinder 200. (This point will be described later (FIG. 12).)

The mount 250 is a parallelepiped member formed so as to continue from a lower part of the rear guide cylinder 230, and serves as an attachment mount for the detection head 320. Because the mount 250 is an attachment mount for the detection head 320, the attitude of the detection head 320 is to a certain degree determined by the surface precision of the mount 250. Here, if the rear side of the holding cylinder 200 is thought of as a parallelepiped member, the parallelism, right angles, and the like of the planes thereof are assumed to be realized with a high level of precision.

The attitude adjustment pin 400 will be described next. The attitude adjustment pin 400 is an adjustment mechanism for finely adjusting the spindle 110 around the axis thereof at minute angles (roll angles) when the product is assembled, and prevents the spindle 110 from rotating after the product has been assembled. Such fine adjustments to the spindle 110 around the axis thereof at minute angles (roll angles) are of course made to adjust the angle of the scale surface 311 of the scale 310. The attitude adjustment pin 400 is essentially what is known as an eccentric pin. A base end of the attitude adjustment pin 400 is fixed to a side surface of the spindle 110, and a tip end of the attitude adjustment pin 400 is inserted into the guide slit portion 240.

In consideration of the adjustment process carried out when assembling the product, the attitude adjustment pin 400 is in the embodiment constituted of three members, namely a double-ended screw 410, a rubber bushing 420, and an eccentric nut (a pin head) 430, as illustrated in FIG. 7, for example.

The double-ended screw 410 has two male screws, with the male screw on the lower side being a first male screw 411 and the male screw on the upper side being a second male screw 412. An intermediate portion 413 larger in diameter than the screw portions is provided between the first male screw 411 and the second male screw 412, and an upper surface of the intermediate portion 413 is a flat surface 414. This flat surface is referred to as a "seating surface 414" hereinafter.

The rubber bushing 420 is a thin elastic ring formed from a resin. The second male screw 412 is inserted into the hole of the rubber bushing 420, and the rubber bushing 420 is then sandwiched between the seating surface 414 and the eccentric nut 430 (see FIG. 8, for example). The rubber bushing 420 is for applying slight pressure to the eccentric nut 430 to prevent the eccentric nut 430 from rotating easily during the attitude adjustment process when assembling the product.

Figure 9:
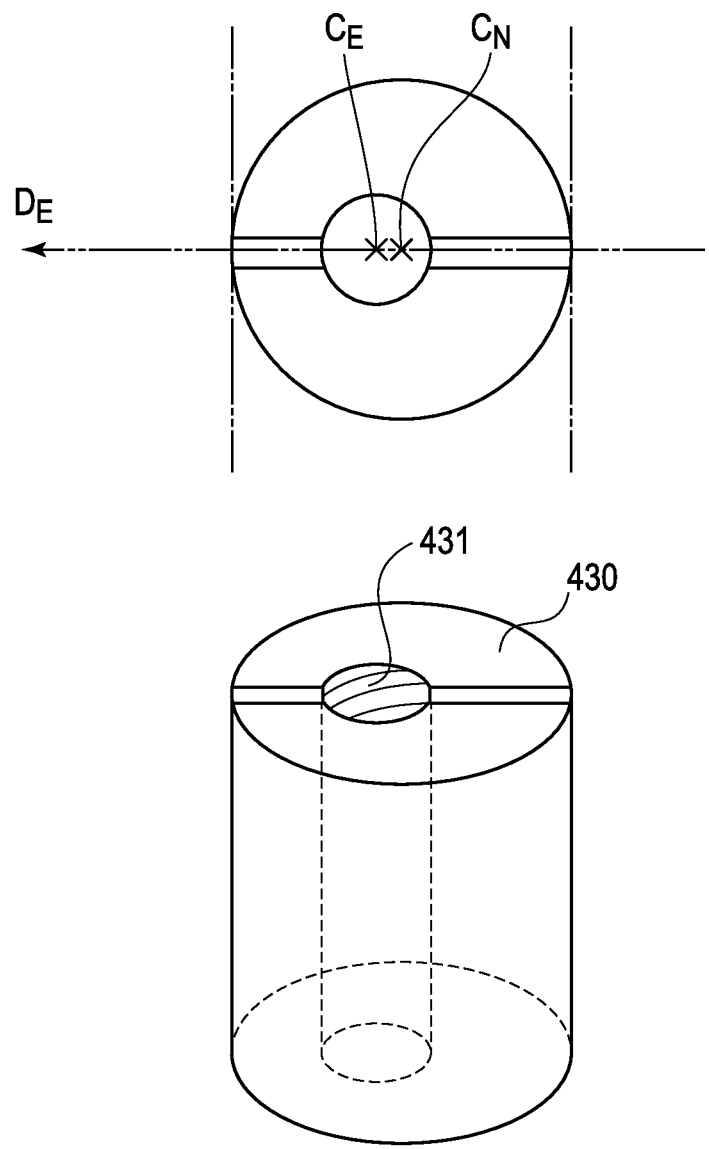
FIG. 9 is a diagram illustrating an eccentric nut of an embodiment.

As illustrated in FIG. 9, the eccentric nut 430 has an off-center female screw 431 (threaded portion).

The female screw 431 is formed so as to be shifted slightly relative to a center $C_N$ of the outer circle defined by the outer surface of the nut 430. The center of the female screw 431 is represented by $C_E$. A direction from the center $C_N$ toward the center $C_E$ is referred to as an eccentricity direction $D_E$ of the eccentric nut 430. In addition, the eccentric nut 430 is made with the diameter thereof matching the width of the guide slit portion 240 such that when the eccentric nut 430 is inserted into the guide slit portion 240, there is no looseness between the two. Adjusting the attitude of the spindle 110 using the attitude adjustment pin 400 will be described later.

The cover part 500 is constituted of a cuboid outer case 510 and a cap 520 that closes off a rear end of the outer case 510. The end plate 210 of the holding cylinder 200 is fitted into a front end side of the outer case 510.

Adjustment Process Using Attitude Adjustment Pin

Alignment adjustment using the attitude adjustment pin 400 will be described next with reference to FIGS. 10 to 14. FIGS. 10 to 14 are diagrams illustrating a cross-section obtained by cutting in a direction perpendicular to the axis line of the spindle 110 slightly in front of the attitude adjustment pin 400, from the direction following the axis of the spindle 110. The spindle 110 is not hatched here in order to make the diagrams easier to view. The top surface of the eccentric nut 430 is also indicated at the very top of each drawing.

Figure 10:
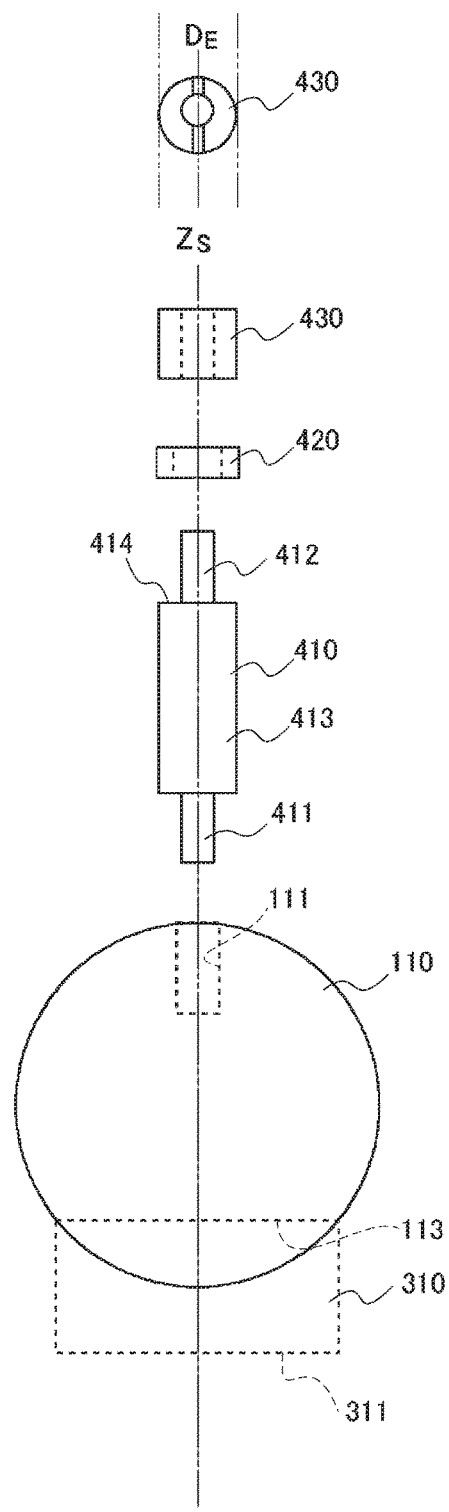
FIG. 10 is a diagram illustrating a cross-section obtained by cutting in a direction perpendicular to an axis line of a spindle, from the direction following the axis of the spindle.
Figure 11:
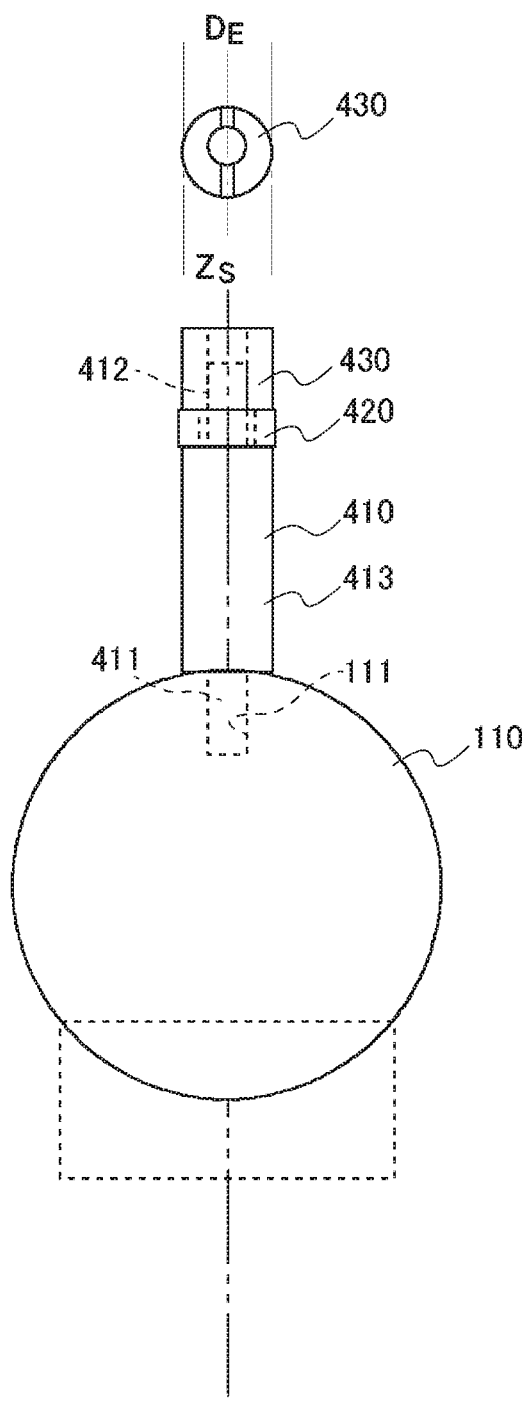
FIG. 11 is a diagram illustrating a cross-section obtained by cutting in a direction perpendicular to the axis line of the spindle, from the direction following the axis of the spindle.

Before describing the adjustment process, an example of the error that is to be adjusted will be described first with reference to FIGS. 10 to 12. FIGS. 10 and 11 are diagrams illustrating the spindle 110 and the attitude adjustment pin 400 alone. In FIG. 10, the attitude adjustment pin 400 is illustrated in an exploded state, whereas in FIG. 11, the attitude adjustment pin 400 is screwed into a side surface of the spindle 110. It is assumed here that the spindle 110 has been machined according to the design, as illustrated in FIGS. 10 and 11. In other words, assuming the axis line of the female screw 111 is represented by $Z_S$, the scale attachment surface 113 is perpendicular to the axis line $Z_S$, and thus, the scale surface 311 of the scale 310 is also perpendicular to the axis line $Z_S$.

Figure 12:
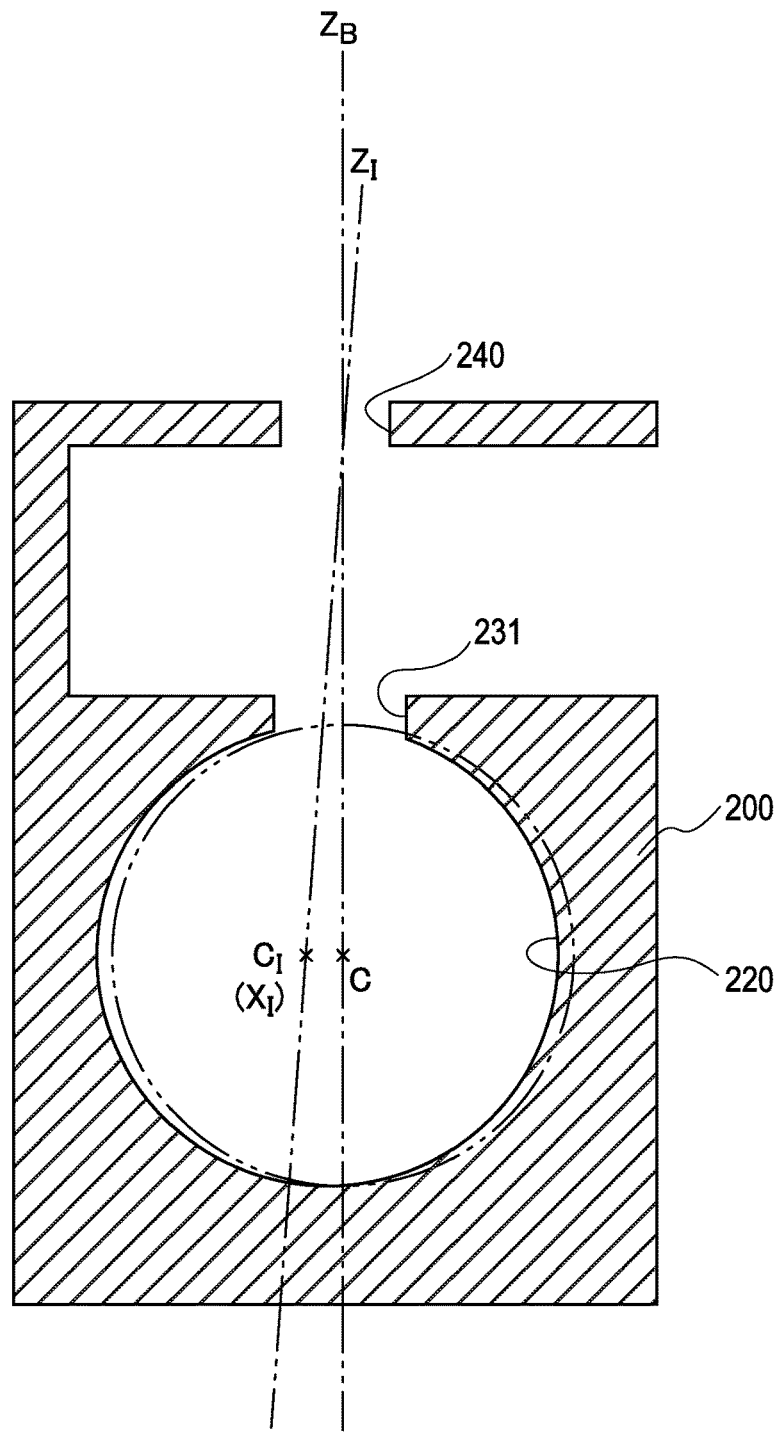
FIG. 12 is a diagram illustrating a cross-section (an end surface) of the holding cylinder.

Meanwhile, FIG. 12 is a diagram illustrating a cross-section of the holding cylinder 200. This drawing illustrates an end surface for the sake of clarity.

It is assumed that the inner surface of the guide cylinder part 220 has been finished with an extremely high level of precision but that the position of the cylinder hole thereof is shifted slightly from the intended design. An axis passing through the widthwise center of the guide slit portion 240 and perpendicular to a cylinder axis line $X_I$ of the guide cylinder part 220 is represented by $Z_I$. Such being the case, the axis $Z_I$ is tilted slightly from the ideal center axis $Z_B$ of the holding cylinder 200. (This tilt is extremely fine, on the order of $1/100°$, for example.)

Figure 13:
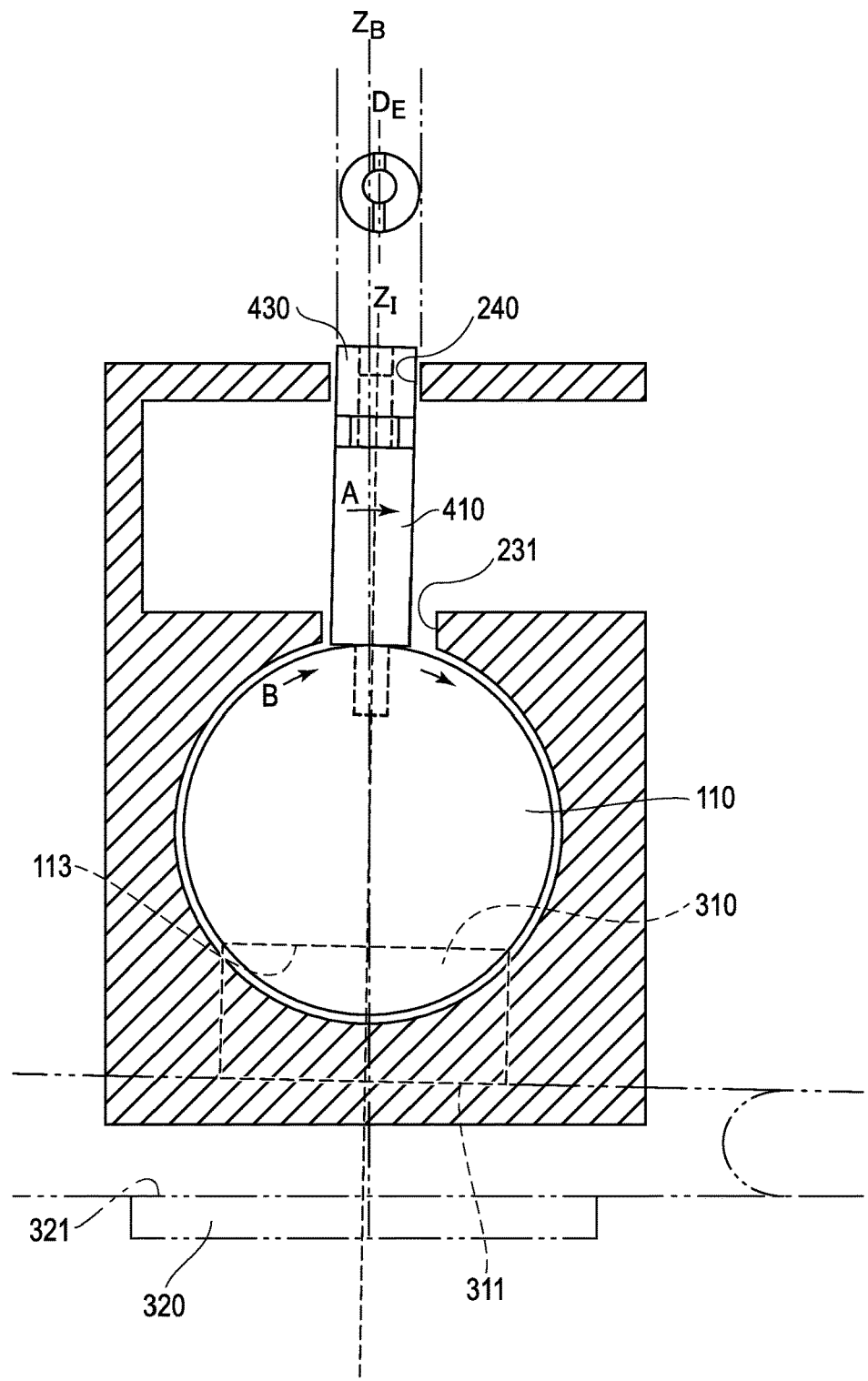
FIG. 13 is a diagram illustrating a cross-section obtained by cutting in a direction perpendicular to the axis line of the spindle, from the direction following the axis of the spindle, partway through the assembly of the linear gage.

The alignment is adjusted while assembling the linear gage 100 assuming the presence of machining error such as described above. As illustrated in FIG. 13, an assembler passes the spindle 110 through the guide cylinder part 220, and then passes the attitude adjustment pin 400 through the guide slit portion 240 and screws the pin into the side surface of the spindle 110. (Note that the size of the gap is exaggerated in FIGS. 13 and 14 in order to make the depictions easier to view.) A this point in time, the first male screw 411 of the double-ended screw 410 and the female screw 111 of the spindle 110 are strongly bonded using an adhesive or the like such that the double-ended screw 410 does not rotate. Meanwhile, the eccentric nut 430 is screwed onto the second male screw 412 so as to strongly press the rubber bushing 420 against the seating surface 414, but is not yet bonded thereto. The eccentric nut 430 can be rotated forward and rearward using a tool such as a wrench or a screwdriver.

Here, even if the eccentricity direction $D_E$ of the eccentric nut 430 is parallel to the axis line of the guide slit portion 240 (that is, even if the attitude adjustment pin 400 is not off-center due to the eccentric nut 430), machining error in the holding cylinder 200 (the guide cylinder part 220) will cause the attitude adjustment pin 400 to tilt slightly (arrow A in FIG. 13), and thus the spindle 110 will also rotate slightly around its axis (arrow B in FIG. 13). Rotation of the spindle 110 (arrow B in FIG. 13) also causes the scale attachment surface 113 to rotate, which means that the scale surface 311 of the scale 310 will tilt. Such being the case, the scale surface 311 of the scale 310 will no longer be parallel to the detection surface 321 of the detection head 320, which leads to a drop in the detection accuracy.

Incidentally, it is not actually possible to visually confirm whether or not the scale surface 311 is tilted due to machining error. Accordingly, the encoder 300 is turned on to obtain a detection signal from the detection head 320 and confirm the state of the signal. It is confirmed whether or not the detection signal is sufficiently strong, for example. Changes in the detection signal when, for example, the spindle 110 is moved forward and rearward are also checked.

For example, with a photoelectric encoder, two or more phase signals are extracted to obtain a circular-movement Lissajous figure. The circularity of the Lissajous figure is directly related to interpolation precision, and thus, the Lissajous figure will distort and the interpolation precision will decrease if the attitudes of the scale 310 and the detection head 320 are skewed. In reflective photoelectric encoders in particular, extremely small amounts of skew in the attitudes of the scale 310 and the detection head 320 have a large effect on distortion of the detection signal. Adjusting the attitudes of the scale 310 and the detection head 320 is thus extremely important.

The assembler observes the detection signal while moving the spindle 110 and carries out the adjustment process upon determining that the attitudes of the scale 310 and the detection head 320 are skewed. In other words, the assembler uses a tool (a wrench or screwdriver, for example) to rotate the eccentric nut 430 very slightly, checks the effect of that adjustment by moving the spindle 110 forward and rearward, and finds the optimal angle of the eccentric nut 430.

Figure 14:
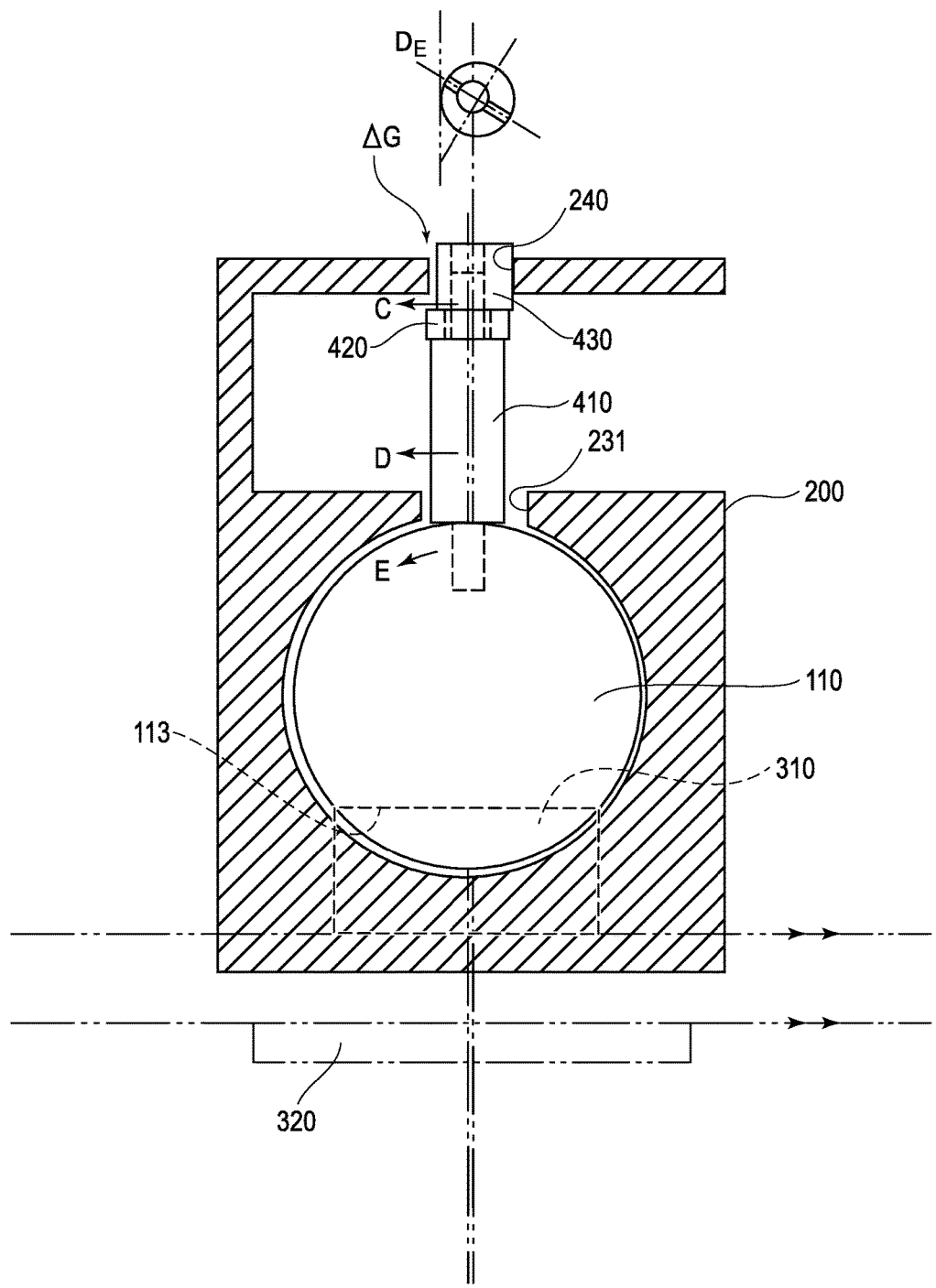
FIG. 14 is a diagram illustrating a cross-section obtained by cutting in a direction perpendicular to the axis line of the spindle, from the direction following the axis of the spindle, partway through the assembly of the linear gage.

Assume here that rotating the eccentric nut 430 slightly in the counterclockwise direction from the state illustrated in FIG. 13 results in the state illustrated in FIG. 14. The eccentricity ($D_E$) of the eccentric nut 430 causes the second male screw 412 of the double-ended screw 410 to displace slightly to the left (arrow C in FIG. 14). Note that the eccentric nut 430 has a circular outer shape and the eccentric nut 430 is inserted into the guide slit portion 240 such that there is as little looseness as possible, and thus, the position of the eccentric nut 430 itself does not change. The eccentric nut 430 simply rotates.

As the second male screw 412 displaces (arrow C in FIG. 14), the double-ended screw 410 also displaces (arrow D in FIG. 14). As a result, the female screw 111 of the spindle 110 is also displaced to the left. The displacement of the female screw 111 causes the spindle 110 to rotate around the axis thereof (arrow E in FIG. 14). The rotation of the spindle 110 also causes the angle of the scale attachment surface 113 to rotate, and thus, the attitude of the scale 310 changes.

The assembler rotates the eccentric nut 430 slightly, moves the spindle 110 forward and rearward, and checks the detection signal. When the spindle 110 moves, the eccentric nut 430 slides along the guide slit portion 240, but the eccentric nut 430 does not turn easily. That is, the rubber bushing 420 is sandwiched between the eccentric nut 430 and the seating surface 414, and thus, the eccentric nut 430 does not rotate easily. When the eccentric nut 430 is rotated so as to be slightly off-center relative to the guide slit portion 240 as illustrated in FIG. 14, it is possible that the eccentric nut 430 will make biased contact with the guide slit portion 240. At this time, the edge of the guide slit portion 240 where the biased contact is made may try to rotate the eccentric nut 430 in one direction when the spindle 110 is moved in the one direction. It is in light of such a situation that the attitude adjustment pin 400 is constituted of a plurality of members, with the rubber bushing 420 sandwiched between the eccentric nut 430 and the seating surface 414. The assembler can therefore move the spindle 110 forward and rearward repeatedly, and find the angle of the eccentric nut 430 that provides the best detection signal, without worrying about unintended rotation of the eccentric nut 430.

Although a similar effect can be achieved by using a spring washer instead of the rubber bushing 420, the nature of the deformation in the shape of a spring washer means that the eccentric nut 430 will be pushed not straight upward but rather at a slight angle. There is thus a chance that the spring washer will exert an unexpected force on the attitude adjustment pin 400 and the spindle 110. The rubber bushing 420, which has a highly symmetrical shape, is therefore preferable.

Ultimately, once an optimal detection signal is obtained from the detection head 320, a small amount of adhesive is injected into the female screw 431 of the eccentric nut 430 so as to completely fix the eccentric nut 430. The remaining components are then attached, and the linear gage 100 is completed.

In this manner, machining error in components (the holding cylinder 200, for example) can be compensated for by the attitude adjustment pin 400, and thus, the linear gage 100 according to the embodiment can provide high measuring accuracy even when employing a relatively cheap encoder 300.

Further descriptions will now be given regarding the effect of providing the gap L between the guide slit portion 240 and the guide cylinder part 220 (the rear guide cylinder 230). Compared to providing the guide slit 11 in the bushing 10 as in the past (FIG. 4, for example), providing the gap L between the guide slit portion 240 and the guide cylinder part 220 (the rear guide cylinder 230) as in the embodiment reduces looseness in the rotation of the spindle 110 around the axis thereof. Assume here that there is the same amount of machining error in the conventional example (FIG. 4, for example) and in the embodiment. In other words, assume that looseness between the guide slit 11 and the pin 112 in the conventional example (FIG. 4, for example) is $\Delta G$, and looseness between the eccentric nut 430 and the guide slit portion 240 in the embodiment (FIG. 14) is $\Delta G$ as well. Furthermore, assume that rotational looseness around the axis of the spindle 110 is $\Delta \theta_P$ with the looseness in the conventional example (FIG. 4, for example), and that rotational looseness of the spindle 110 is $\Delta \theta_E$ in the embodiment (FIG. 14). $\Delta \theta_P$ and $\Delta \theta_E$ will be as indicated below, and $\Delta \theta_E$ is clearly smaller by the amount of the gap L. As such, the embodiment provides a lower amount of skew between the attitudes of the scale 310 and the detection head 320, which further stabilizes the measuring accuracy of the encoder 300.

$$\Delta \theta_P = (\Delta G/2\pi r) \times 360°$$

$$\Delta \theta_E = \{\Delta G/2\pi(r+L)\} \times 360°$$

where r is the radius of the spindle.

A user of the linear gage 100 will sometimes hold the spindle 110 directly in his/her hand during use (during measurement). At such times, there have been situations where the user unintentionally exerts a rotational force on the spindle 110, leading to skew in the attitude of the encoder 300. With respect to this point, in the embodiment, the attitude adjustment pin 400 is longer. The principle described above works such that the additional length strongly restricts the spindle 110 from rotating. Thus, the precision of the encoder 300 will not decrease even if the user holds the spindle 110 directly.

If the aforementioned ΔG is read as the eccentricity rate (eccentricity level) of the eccentric nut 430, it can be seen that the embodiment ensures a lower angle of rotation in the spindle 110 when the eccentric nut 430 is rotated only slightly. In other words, this means that the attitude of the spindle 110 can be adjusted (roll angle skew can be adjusted) at an extremely fine level. Still, adjusting the rotation of the spindle around the axis thereof using the attitude adjustment pin 400 is done on the order of $1/100°$, which is close to the limit of human vision.

If in the conventional configuration (FIG. 4) the pin is simply replaced with an eccentric pin, it is still possible that the adjustment will not work correctly. However, with respect to this point, the embodiment makes it easier to carry out fine adjustments.

Although it is better for the gap L to be as long as possible, the upper limit on the length of the gap L is by nature a length at which the holding cylinder 200 (the guide slit portion 240) fits within the cover part 500. There is no particular limit on the lower limit, and any value greater than 0 can be used. However, if a value is to be given, the guide slit portion 240 is preferably no less than r (where r represents the radius of the spindle) from the inner surface of the guide cylinder part 220, and more preferably no less than 2r.

According to the embodiment as described thus far, a linear gage that achieves a high level of balance between cost reduction and high measuring accuracy can be provided.

The present disclosure is not intended to be limited to the above-described embodiment, and appropriate variations can be made thereon without departing from the essential spirit of the present disclosure. It is sufficient for the attitude adjustment pin to function as an eccentric pin, and thus the double-ended screw may be eccentric rather than the nut. Additionally, although the foregoing describes the double-ended screw as having male screws and the pin head as being an eccentric nut, the female and male screws may of course be reversed.

Although the detection head of the encoder is described as being fixed to the holding cylinder and the scale as being fixed to the spindle, this may of course be reversed. In the case of a photoelectric encoder, the scale is a glass scale including a diffraction grating, and the detection head is a unit including an LED (this need not be a (semiconductor laser LD)) and a light-receiving element array. However, the type of the encoder is not particularly limited. An electrostatic capacitance-type encoder, a magnetic encoder, or a transmissive photoelectric encoder may be employed, and of course a laser holoscale (LHS) may be employed as well.

The invention claimed is:

1. A linear gage comprising:
   a spindle;
   a guide cylinder surrounding a portion of the spindle and configured to guide the spindle to move forward and rearward in an axis line direction;
   a guide slit portion having a guide slit extending parallel to the axis line of the guide cylinder, with a gap provided between the guide slit and an outer surface of the guide cylinder; and
   an attitude adjustment pin fixed to a side surface of the spindle and extending into the guide slit, wherein the attitude adjustment pin is an eccentric pin.

2. The linear gage according to claim 1, wherein the attitude adjustment pin comprises:
   a double-ended screw, having threaded portions on both a tip end side and a base end side, with the threaded portion on the base end side screwed into the side surface of the spindle; and
   a pin head into which the threaded portion on the tip end side of the double-ended screw is screwed, wherein at least one of the double-ended screw and the pin head is eccentric.

3. The linear gage according to claim 2, further comprising a rubber bushing interposed between the double-ended screw and the pin head.

4. The linear gage according to claim 3, further comprising a scale or a detection head of a reflective photoelectric encoder fixed to the spindle.

5. The linear gage according to claim 2, further comprising a scale or a detection head of a reflective photoelectric encoder fixed to the spindle.

6. The linear gage according to claim 1, further comprising a scale or a detection head of a reflective photoelectric encoder fixed to the spindle.

7. A linear gage comprising:
   an elongated spindle having a longitudinal axis;
   a hollow guide cylinder through which the spindle extends, the hollow guide cylinder configured to guide the spindle to move forward and rearward in a direction of the longitudinal axis;
   a first guide slit provided in an outer surface of the hollow guide cylinder and extending parallel to the longitudinal axis;
   a guide slit portion having a second guide slit extending parallel to the longitudinal axis and located above the first guide slit with a gap provided between the second guide slit and the first guide slit; and
   an attitude adjustment pin fixed to a side surface of the spindle, the attitude adjustment pin extending through the first guide slit and extending into the second guide slit,
   wherein the attitude adjustment pin is an eccentric pin.

8. The linear gage according to claim 7, wherein a first clearance between the first guide slit and the attitude adjustment pin is larger than a second clearance between the second guide slit and the attitude adjustment pin.

9. The linear gage according to claim 8, further comprising a scale or a detection head of a reflective photoelectric encoder fixed to the spindle.

10. The linear gage according to claim 7, wherein the attitude adjustment pin comprises:
    a double-ended screw, having threaded portions on both a tip end side and a base end side, with the threaded portion on the base end side screwed together with the side surface of the spindle; and
    a pin head that is screwed together with the threaded portion on the tip end side of the double-ended screw, wherein at least one of the double-ended screw and the pin head is eccentric.

11. The linear gage according to claim 10, wherein the pin head is eccentric by having a threaded portion that is offset from a center of the pin head.

12. The linear gage according to claim 11, further comprising a scale or a detection head of a reflective photoelectric encoder fixed to the spindle.

13. The linear gage according to claim 10, further comprising an elastic bushing interposed between the double-ended screw and the pin head.

14. The linear gage according to claim 13, further comprising a scale or a detection head of a reflective photoelectric encoder fixed to the spindle.

15. The linear gage according to claim 10, further comprising a scale or a detection head of a reflective photoelectric encoder fixed to the spindle.

16. The linear gage according to claim 7, further comprising a scale or a detection head of a reflective photoelectric encoder fixed to the spindle.

* * * * *